UNITED STATES PATENT OFFICE.

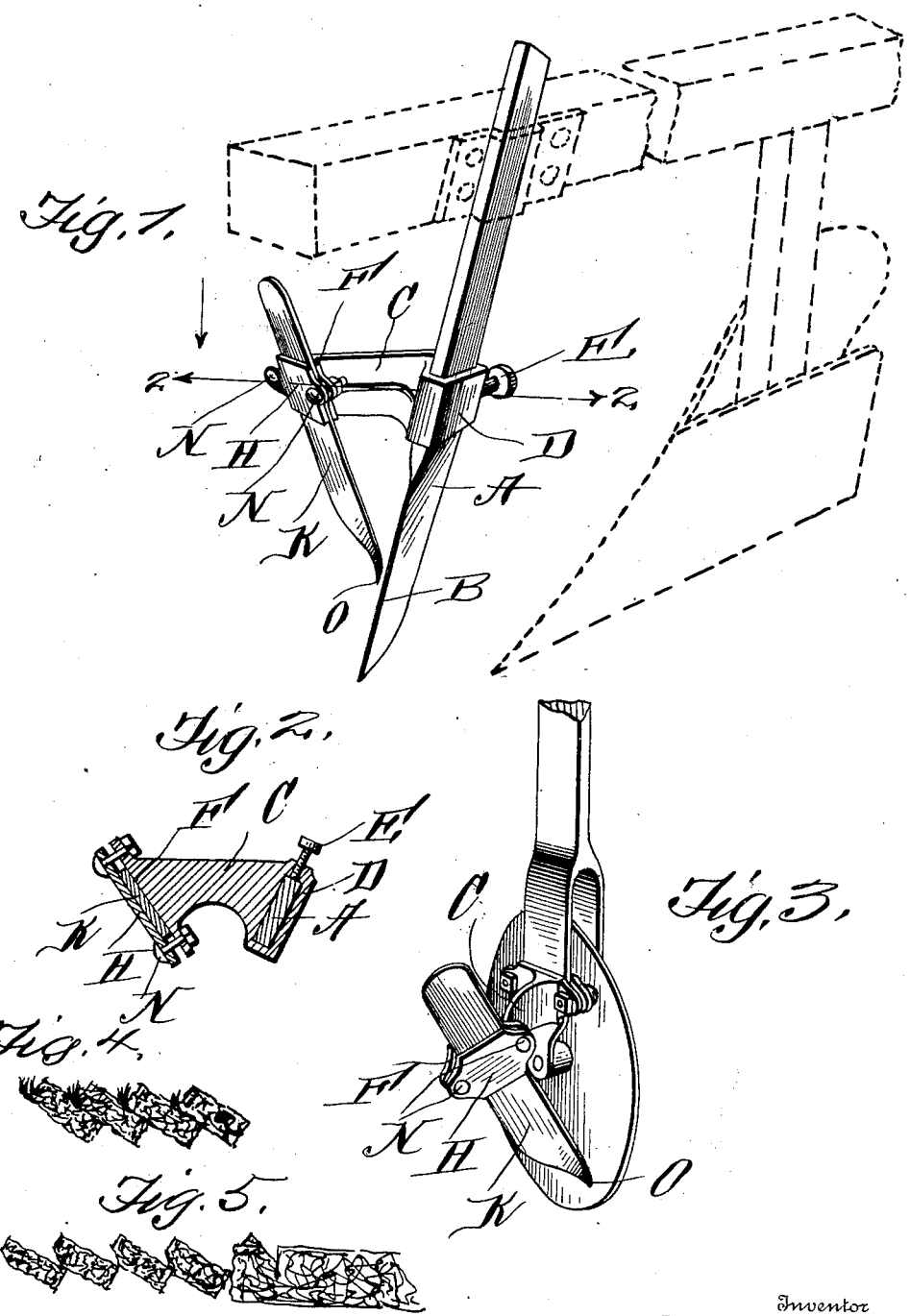

ALPHEUS A. LUNDY, OF FENWICK, CANADA.

PLOW-SKIMMER.

No. 829,592.  Specification of Letters Patent.  Patented Aug. 28, 1906.

Application filed March 22, 1906. Serial No. 307,497.

*To all whom it may concern:*

Be it known that I, ALPHEUS A. LUNDY, a subject of the King of Great Britain, residing at Fenwick, in the Province of Ontario, Canada, have invented certain new and useful Improvements in Plow-Skimmers; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in attachments to plows, colters, &c.; and the object of the invention is to produce a device of this nature which may be attached to a cutting knife or colter for the purpose of skimming or cutting off a thin portion of the sod or soil and which may be allowed to fall into a furrow, leaving the under side of the higher edge of the furrow to lap clear of grass or weeds, thereby preventing the latter from growing between the furrow-laps.

More specifically, the invention comprises a skimmer adapted to be held by suitable clamping means at one side of the cutting part of a colter or knife and in the path of the furrow, as it is thrown by a plow, and arranged to operate after the edge of the furrow has been cut, thereby relieving the skimmer from the harder portion of the work incident to the furrow being loosened.

My invention is illustrated in the accompanying drawings, which, with the letters of reference marked thereon, form a part of this application, and in which—

Figure 1 is a perspective view showing the application of my invention to a straight cutting-plate. Fig. 2 is a cross-section on line 2 2 of Fig. 1, and Fig. 3 shows its application to a rotary colter. Fig. 4 is a detail view showing the manner in which weeds grow between the overlapped furrows when turned with the ordinary plow; and Fig. 5 is a detail view showing a corner of the furrow skimmed over to prevent the weeds growing between the furrows as they are turned.

Reference now being had to the details of the drawings by letter, A designates a straight colter-blade adapted to be held to a plow in the usual manner and provided with a cutting edge B.

C is a bracket-arm having a hollow head D, adapted to telescope over the shank portion of said straight colter, and E is a set-screw designed to hold said head in an adjusted position. The outer end of said bracket-arm is diagonally disposed and provided with a jaw F, adapted to coöperate with a removable jaw H to hold the skimmer K in an adjusted position. Bolts N are passed through apertured lugs in said jaws, whereby the skimmer may be securely held in an adjusted position. One end of said skimmer has a diagonal cutting edge and a point O, which is slightly curved, as shown in the drawings. It will be noted in adjusting the skimmer in place that the same is held slightly in the rear of the cutting edge of the colter and at an inclination thereto, whereby as the sod is loosened a thin portion of the corner thereof is skimmed or cut off and allowed to fall upon the furrow, thereby preventing the grass, weeds, or other plants extending up through the furrows as they are turned one upon another, which will effectually prevent the same from growing between the furrow-laps. Being arranged to operate after the edge of the furrow has been cut, the skimmer is relieved from the harder portion of the work as the sod is cut by the colter before the skimmer comes into operation, and by the provision of the apparatus shown and described, the skimmer will not become liable to be clogged or choked while operating in coarse litter, &c. The peculiar shape and position of the skimmer-bit gives that portion of the soil which is skimmed or cut a rolling motion toward the bottom of the furrow, thus insuring a free passage.

In Fig. 2 of the drawings I have shown the application of my invention to a rotary colter in which the blade is held in a similar manner upon a bracket-arm adjacent to the colter and a slight distance therefrom, as clearly illustrated.

What I claim is—

1. In combination with a colter, a bracket-arm adjustably mounted upon the shank portion thereof, a jaw disposed at an angle at one end of said arm, a detachable clamping-jaw, a skimmer engaged by said jaws, and tightening-nuts for holding the same in an adjusted position at an angle to the colter, as set forth.

2. In combination with a colter, a bracket-arm adjustably mounted upon the shank portion thereof, a jaw disposed at an angle at one end of said arm, a detachable clamping-jaw, a skimmer engaged by said jaws, and tightening-nuts for holding the same in an adjusted position at an angle to the colter, the cutting edge of said skimmer being provided with a curved point which is held adjacent to and slightly at the rear of the cutting edge of the colter, as set forth.

In testimony whereof I hereunto affix my signature in the presence of two witnesses.

ALPHEUS A. LUNDY.

Witnesses:
GEORGE W. TUTTLE,
ANNIE V. MULLIN.